Figure 1:
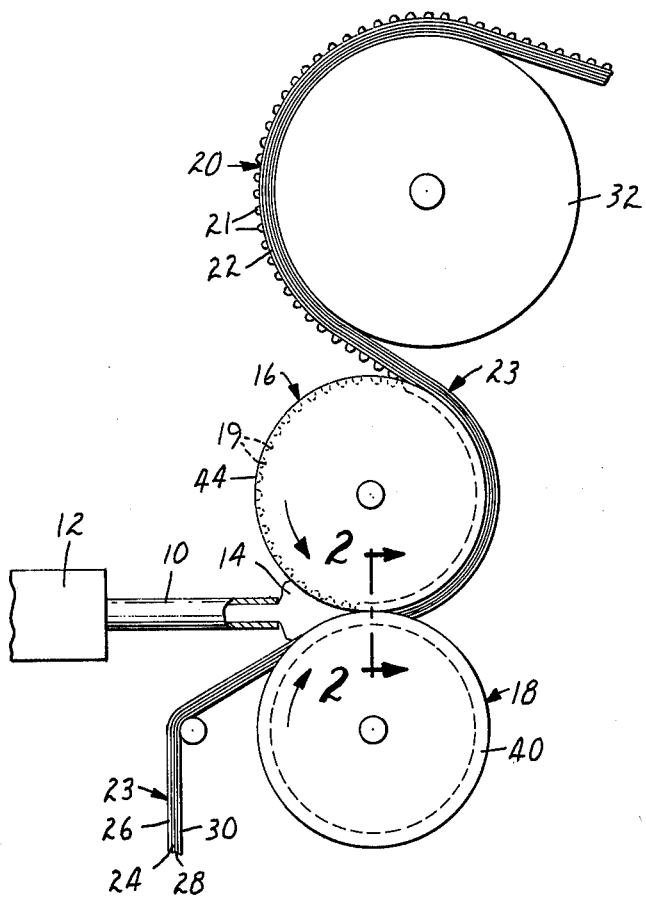

United States Patent [19]

Brown

[11] 4,086,388
[45] Apr. 25, 1978

[54] RUBBERY CUSHION HAVING PRESSURE-SENSITIVE ADHESIVE LAYER

[75] Inventor: James N. Brown, White Bear Lake, Minn.

[73] Assignee: Minnesota Mining and Manufacturing Company, St. Paul, Minn.

[21] Appl. No.: 769,233

[22] Filed: Feb. 16, 1977

[51] Int. Cl.² .............................................. B32B 3/26
[52] U.S. Cl. .................................. 428/315; 428/158; 428/172; 428/355; 428/420; 428/483; 428/517; 428/910
[58] Field of Search ............... 428/40, 156, 158, 159, 428/172, 315, 355, 420, 483, 515, 516, 517, 910

[56] References Cited

U.S. PATENT DOCUMENTS

| | | | |
|---|---|---|---|
| 3,188,266 | 6/1965 | Charbonneau | 428/420 |
| 3,954,692 | 5/1976 | Downey | 428/517 |
| 3,962,018 | 6/1976 | Costemalle | 428/517 |
| 3,993,833 | 11/1976 | Esmay | 428/311 |
| 4,011,358 | 3/1977 | Roelofs | 428/517 |

*Primary Examiner*—William J. Van Balen
*Attorney, Agent, or Firm*—Cruzan Alexander; Donald M. Sell; Robert E. Granrud

[57] ABSTRACT

A bumper button or strip comprising (a) a rubbery cushion of oil-plasticized thermoplastic elastomer, (b) a dual-layer film, one layer of which is a polyolefin such as polyethylene fused to the rubbery cushion, the other layer of which is an oriented polyester polymer such as biaxially-oriented polyethylene terephthalate film, and (c) a pressure-sensitive adhesive layer adhered to the polyester polymer. The polyester polymer serves as a barrier to prevent migration of the plasticizing oil into the pressure-sensitive adhesive.

10 Claims, 4 Drawing Figures

U.S. Patent  April 25, 1978  4,086,388

RUBBERY CUSHION HAVING PRESSURE-SENSITIVE ADHESIVE LAYER

FIELD OF THE INVENTION

The invention concerns rubbery cushions having pressure-sensitive adhesive layers and is especially concerned with outdoor use.

BACKGROUND TO THE INVENTION

Among numerous applications, rubbery cushions are used as bumper buttons or strips for automobile hoods and gasoline-filler doors and as feet for small clocks and radios. For convenience of application, one surface of the cushion may have a pressure-sensitive adhesive layer and a removable covering to protect the adhesive. Rubbery cushions which have pressure-sensitive adhesive layers are often made of filled cured polyurethane resins or of thermoplastic elastomer compositions.

The term "thermoplastic elastomer" designates a material which at ordinary room temperature exhibits the mechanical properties of a vulcanized rubber but remains permanently fusible and soluble and can be processed in a conventional manner on equipment designed for thermoplastic resins. The molecular network of a thermoplastic elastomer consists of two distinct microscopically-identifiable phases, a crystalline (hard) and an amorphous (soft) phase.

Among thermoplastic elastomers, the noncuring polyurethane elastomers provide excellent rubbery cushions but are relatively expensive and can be extended only to a limited degree by cost-reducing diluents such as plasticizing oils. Thermoplastic polyester elastomers have the same advantage and disadvantages.

Another class of thermoplastic elastomers comprises simple A-B-A block copolymers where A represents a crystalline polystyrene end block and B, an amorphous polybutadiene or polyisoprene center block. The class includes more complex configurations of the same moieties. Although less expensive than polyurethane and polyester thermoplastic elastomers and more readily subject to cost-reducing addition of plasticizing oil and other diluents, these block copolymers are inferior to the polyurethane and polyester elastomers in that they tend to degrade under prolonged exposure to ozone, ultraviolet light or high temperatures due to their olefinic unsaturation.

For applications requiring both low cost and good resistance to adverse environment, a preferred class of thermoplastic elastomers comprises block copolymers having crystalline polystyrene and/or crystalline polyolefin blocks and amorphous saturated polyolefin blocks. Representative thermoplastic elastomers of this preferred class are "Kraton G" (Shell Chemical Co.), "Telcar" (B. F. Goodrich Chemical Co.), "TPR" (Uniroyal, Inc.) and "Somel" (E. I. duPont). In all of the aforementioned block copolymers, the majority of the end blocks should be crystalline.

A preferred diluent for the block copolymers is plasticizing oil, since it both reduces cost and also improves their workability and flexibility by lowering melt viscosity, second-order transition temperature and/or elastic modulus. Plasticizing oils which are most commonly used are ASTM type 103 or 104, commonly called naphthenic and paraffinic, respectively. Naphthenic oils contain less than 6% polar compounds and 35.1 to 65% saturated hydrocarbons; paraffinic oils contain less than 1% polar compounds and a minimum of 65.1% saturated hydrocarbon. Paraffinic oils are preferred from the outdoor weathering standpoint but are more migratory in thermoplastic elastomer compositions.

Rubbery cushions consisting of thermoplastic elastomer compositions including appreciable plasticizing oil have not heretofore been furnished with pressure-sensitive adhesive layers, because the adhesive tends to soften unduly through absorption of the oil within a relatively short time, thus weakening its holding power. The plasticizing oil likewise tends to weaken diverse types of adhesives which one would otherwise use to hold the rubbery cushions in place.

THE PRESENT INVENTION

In the practice of the present invention, rubbery cushions of oil-plasticized thermoplastic elastomer compositions are provided with pressure-sensitive adhesive layers which are not subject to undue softening. The rubbery cushions can be adhered by their pressure-sensitive adhesive layers to substrates and remain firmly in place indefinitely in the face of repeated shearing stresses, even under prolonged exposure to adverse weather conditions. Briefly the invention involves (a) a rubbery cushion comprising a thermoplastic elastomer composition including at least two parts of a plasticizing oil per 100 parts by weight of the elastomer, (b) a thin chemically-interfacially-bonded dual-layer film, one layer of which is a polyolefin which is fused to the rubbery cushion, the other layer of which is an oriented polyester polymer, and (c) a pressure-sensitive adhesive layer adhered to the polyester polymer.

The polyolefin layer of the dual-layer film is inseparably bonded both to the elastomer composition and to the polyester layer which acts as a barrier preventing the plasticizing oil from reaching the adhesive in amounts sufficient to have a noticeable softening effect, even after long periods of time. The chemical interfacial bond between the layers of the dual-layer film may be created as disclosed in U.S. Pat. No. 3,188,265 (Charbonneau). The dual-layer film may be as thin as about 0.02 mm but should not exceed about 0.4 mm so as not to impart undue rigidity at the pressure-sensitive adhesive. Preferably it is 0.05-0.25 mm in thickness.

A preferred polyester polymer of the dual-layer film is biaxially-oriented polyethylene terephthalate film, being readily available commercially at modest cost. Other useful polyester polymers include polybutylene terephthalate.

The polyolefin of the dual-layer film may be polyethylene which is low in cost and readily fuses to the thermoplastic elastomer compositions at moderately elevated temperatures. Polypropylene and copolymers of propylene and ethylene require somewhat higher temperatures to fuse but form exceedingly strong bonds to the elastomer compositions. The aforementioned polyolefins require an activating step to form a chemical interfacial bond to the oriented polyester polymer, e.g., treatment by ultraviolet light or corona discharge. Other useful polyolefins include copolymers of ethylene or propylene with minor amounts of acrylic acid, methacrylic acid, methyl acrylate, butyl acrylate, vinyl chloride or other polar monomers, which copolymers do not require the aforementioned activating step.

Preferred thermoplastic elastomers are the aforementioned block copolymers because of their low cost, flexibility and workability. For outdoor use, the amorphous blocks should be saturated. These block copolymers can provide good cushioning properties at levels of the plasticizing oil up to twice the weight of the thermoplastic elastomer. At higher levels of the plasticizing oil, the polyolefin layer of the dual-layer film may not bond strongly to the thermoplastic elastomer composition. Optimum properties are attained at 10–100 parts by weight of the plasticizing oil per 100 parts of the thermoplastic elastomer. Below 2 parts oil by weight, the elastomer composition tends to lack the lubricity desired for forming it at high production rates.

The thermoplastic elastomer composition may be blended with a variety of other materials such as pigments and other ultraviolet-inhibiting compounds, antioxidants and inert fillers.

Any pressure-sensitive adhesive may be employed which has good adhesive properties and adequate resistance to aging. Particularly preferred in this respect are the acrylic copolymers disclosed in U.S. Pat. Re. No. 24,906. Also preferred are terpene-resin-modified block copolymer adhesives as described in U.S. Pat. No. 3,389,827. Less preferred but nevertheless useful are pressure-sensitive adhesives based on mixtures of natural or synthetic rubber and resinous tackifiers although they tend to resinify over a period of time.

The pressure-sensitive adhesive layer may incorporate a foam as disclosed in Canadian Pat. No. 747,341. If the pressure-sensitive adhesive layer may be exposed to gasoline or other solvents, a preferred foam-containing pressure-sensitive adhesive layer is disclosed in U.S. Pat. No. 3,993,833.

THE DRAWING

Figure 3:
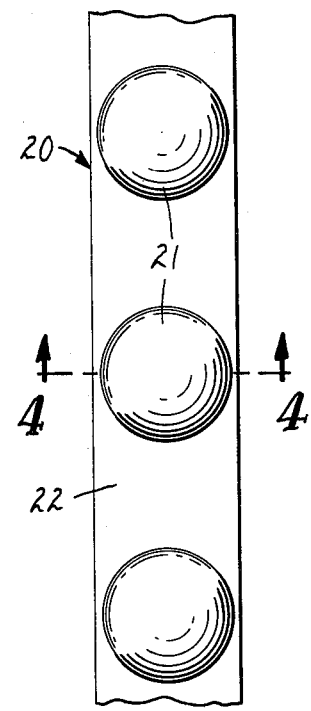
Figure 4:
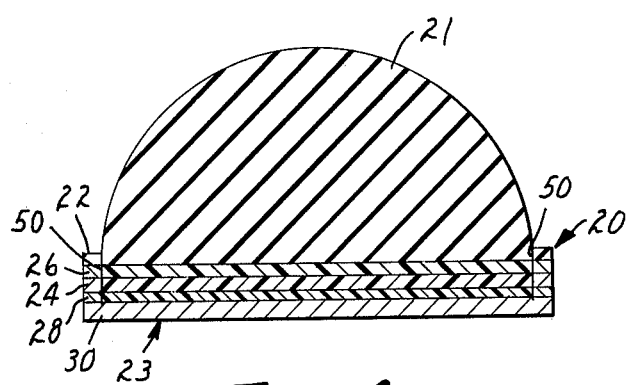
Figure 2:
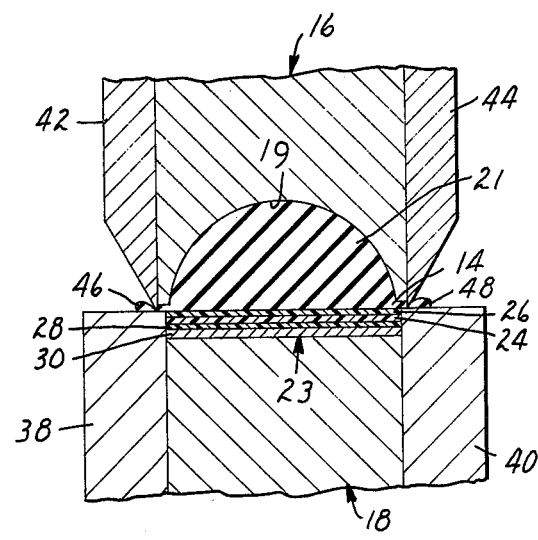

In the drawing
FIG. 1 is a schematic elevation of apparatus for producing an adhesive-bearing rubbery cushion in the practice of the invention;
FIG. 2 is an enlarged schematic cross-section along line 2—2 of FIG. 1;
FIG. 3 shows the face of the cushion produced by the apparatus of FIGS. 1 and 2; and
FIG. 4 is a schematic cross-section along line 4—4 of FIG. 3.

Referring to FIG. 1, a molten oil-plasticized thermoplastic elastomer composition is extruded through the nozzle 10 of a screw-type extruder 12 to form a bank or nip of molten material 14 at an orifice between a steel forming wheel 16 and a steel doctor wheel 18 which rotate at the same uniform speed in the direction of the arrows. The circumferential surface of the forming wheel 16 consists of a continuous series of symmetrical cavities 19. The molten material 14 fills the cavities 19 and is solidified as it is cooled by water circulated through a network of channels (not shown) in the forming wheel 16 to provide a rubbery cushion 20 in the form of a continuous strip of buttons 21 connected by a thin web 22 of the elastomer composition.

Also entering the nip between the wheels 16 and 18 is a tape 23 comprising a dual-layer film consisting of an oriented polyester polymer layer 24 and a polyolefin layer 26. Adhered to the polyester layer 24 is a pressure-sensitive adhesive layer 28 which is protected by a disposable low-adhesion covering 30. Upon being drawn into the nip of molten material 14, the polyolefin layer 26 fuses and upon cooling becomes inseparably united to the rubbery cushion 20. The interbonded rubbery cushion 20 and tape 23 are carried around an internally-water-cooled roll 32 and wound up into roll form for convenient storage and shipment.

Bolted to the sides of the doctor wheel 18 as seen in FIG. 2 are a pair of hardened steel cylindrical anvils 38 and 40 which cooperate with a pair of steel cylindrical knives 42 and 44 bolted to the forming wheel 16. The knives contact the anvils 38 and 40, but excess resin flows to form resin flash at 46 and 48 which fuses lightly to the edges of the web 22 and is later readily peeled away.

A die punch (not shown), the opening of which receives the individual buttons 21 of the rubbery cushion 20, cuts through the web 22 at 50 (FIG. 4) without cutting through the protective covering 30, so that the buttons 21 may be sequentially lifted from the covering 30 and applied to intended objects.

EXAMPLE

The adhesive-bearing rubbery cushion 20 has been made in strip form as schematically illustrated in FIGS. 1 and 2 using as the thermoplastic elastomer a styrene-ethylene-butylene-styrene block copolymer containing about 60 parts of paraffinic plasticizing oil per 100 parts by weight of the copolymer. Such an oil-plasticized thermoplastic elastomer composition is available commercially from Shell Chemical Co. as "Kraton G 7720". Blended with the elastomer composition was 2% by weight of black color concentrate. The tape 23 included a dual-layer film consisting of chemically-interfacially-bonded layers of polyethylene and biaxially-oriented polyethylene terephthalate film. The polyethylene and the polyester film were each approximately 0.03 mm in thickness. Adhered to the polyester film was a layer of pressure-sensitive adhesive consisting of a copolymer of 90 parts isooctylacrylate and 10 parts by weight of acrylic acid. Protecting the adhesive layer was a low-adhesion covering consisting of thin kraft glassine paper treated with a silicone release coating on the adhesive side.

The colored elastomer composition at a temperature of 177° C was extruded through a nozzle 10 of 11 mm inside diameter while the rolls 16 and 18 were rotated at the constant surface speed of 3 M per minute to produce a rubbery cushion having a series of buttons 21, each 11 mm in diameter and 5 mm in height temporarily connected by a web 22 about 1 mm in thickness.

I claim:
1. An article of manufacture comprising
   (a) a rubbery cushion comprising a thermoplastic elastomer composition including 2–200 parts of a plasticizing oil per 100 parts by weight of the elastomer,
   (b) a chemically-interfacially-bonded dual-layer film 0.02 to 0.4 mm in thickness, one layer of which is a polyolefin which is fused to the rubbery cushion, the other layer of which is an oriented polyester polymer, and
   (c) a pressure-sensitive adhesive layer adhered to the polyester polymer.
2. An article as defined in claim 1 wherein the thermoplastic elastomer is a block copolymer and the majority of the end blocks are crystalline.
3. An article as defined in claim 2 wherein the block copolymer has crystalline polystyrene and/or crystalline polyolefin and amorphous saturated polyolefin blocks.

4. An article as defined in claim 3 wherein the block copolymer is a styrene-ethylene-butylene-styrene block copolymer.

5. An article as defined in claim 1 wherein the plasticizing oil is a paraffinic oil.

6. An article as defined in claim 1 wherein the oriented polyester layer of the dual-layer film is biaxially-oriented polyethylene terephthalate film.

7. An article as defined in claim 1 wherein the polyolefin of the dual-layer film is polyethylene, polypropylene or a copolymer of ethylene and propylene.

8. An article as defined in claim 1 wherein the polyolefin of the dual-layer film is a ccopolymer of ethylene or propylene with a minor amount of one of acrylic acid, methacrylic acid, methyl acrylate, butyl acrylate and vinyl chloride.

9. An article as defined in claim 1 wherein there are 10–100 parts of the plasticizing oil per 100 parts by weight of the elastomer.

10. An article as defined in claim 1 wherein the pressure-sensitive adhesive layer incorporates a foam.

* * * * *